(12) United States Patent
Ford et al.

(10) Patent No.: US 11,906,038 B2
(45) Date of Patent: Feb. 20, 2024

(54) SHIFTER MECHANISM WITH MANUAL SHIFT FUNCTION

(71) Applicant: Lokar, Inc., Knoxville, TN (US)

(72) Inventors: Kevin Ford, Knoxville, TN (US); Scott Thiel, Sherwood, OR (US); Eric R. Burgan, Murfreesboro, TN (US)

(73) Assignee: LOKAR, INC., Knoxville, TN (US)

( * ) Notice: Subject to any disclaimer, the term of this patent is extended or adjusted under 35 U.S.C. 154(b) by 497 days.

(21) Appl. No.: 17/127,043

(22) Filed: Dec. 18, 2020

(65) Prior Publication Data

US 2021/0102624 A1 Apr. 8, 2021

Related U.S. Application Data

(63) Continuation-in-part of application No. 15/950,795, filed on Apr. 11, 2018, now Pat. No. 10,871,220.

(60) Provisional application No. 62/484,204, filed on Apr. 11, 2017.

(51) Int. Cl.
| | |
|---|---|
| *F16H 59/02* | (2006.01) |
| *B60K 20/04* | (2006.01) |
| *F16H 59/10* | (2006.01) |
| *F16H 59/04* | (2006.01) |
| *F16H 59/00* | (2006.01) |

(52) U.S. Cl.
CPC ......... *F16H 59/0204* (2013.01); *B60K 20/04* (2013.01); *F16H 59/044* (2013.01); *F16H 59/105* (2013.01); *F16H 2059/006* (2013.01); *F16H 2059/026* (2013.01); *F16H 2059/0239* (2013.01); *F16H 2059/0295* (2013.01)

(58) Field of Classification Search
CPC ............... F16H 61/18; F16H 2059/026; F16H 2061/185; F16H 2059/0239; F16H 59/0204; F16H 59/044; F16H 59/105; F16H 2059/006; F16H 2059/0295; Y10T 74/20067; Y10T 74/2011; B60K 20/04
See application file for complete search history.

(56) References Cited

U.S. PATENT DOCUMENTS 6,148,686 A * 11/2000 Kataumi ............. F16H 59/0204
74/473.18

* cited by examiner

*Primary Examiner* — Jeremy R Severson
(74) *Attorney, Agent, or Firm* — Blanchard Horton PLLC

(57) ABSTRACT

An automatic transmission shifter mechanism that is selectable between an automatic transmission mode and a manual shifting mode, including a shifter assembly, a pin attached to the shifter assembly, a first slotted plate to selectively receive a first portion of the shifter assembly, and a detent plate configured to receive the pin at different gear positions, wherein selected shifter assembly positions in the automatic transmission mode are maintained by the pin being located within a corresponding detent of the detent plate, and wherein movement of the first portion of the shifter assembly into the first slotted plate causes the pin to move out of range of detents in the detent plate such that an operator can shift between drive gears in the manual shifting mode.

15 Claims, 11 Drawing Sheets

SHIFTER MECHANISM WITH MANUAL SHIFT FUNCTION

CROSS-REFERENCE TO RELATED APPLICATIONS

This application is a continuation-in-part of U.S. patent application Ser. No. 15/950,795, filed on Apr. 11, 2018, which claimed the benefit of U.S. Provisional Patent Application Ser. No. 62/484,204, filed on Apr. 11, 2017, the contents of which are incorporated herein in their entirety by reference.

FIELD OF INVENTION

The present general inventive concept relates to vehicle shifter mechanisms, and, more particularly, to an automatic transmission shifter mechanism with a manual shift function.

BACKGROUND

Automatic transmission shifters typically provide one or more features for preventing accidental shifting in different drive modes in order to prevent damage to the vehicle and to provide safety to the driver and passengers. These features are typically known as "lockout." For example, lockout features may prevent accidental shifting from a park position into reverse, drive, and low gears. In various conventional assemblies, a button may be provided to disengage the lockout position and to allow the operator the ability to shift. Other approaches also include moving the shifter generally perpendicularly to its normal direction of travel in order to disengage the lockout function.

While lockout can be very beneficial in the transition from park into reverse and from park into drive, when transitioning between lower and higher gears it might be desirable to allow free shifting without having to disengage the lockout function. Such a feature may more closely replicate the sensations of driving a manual transmission vehicle, and give more control to the operator of the vehicle.

In light of the above, there is a need for an automatic transmission shifter mechanism with a manual shift function. There is a further need for an automatic transmission shifter mechanism which can allow the operator to shift the lever from an overdrive mode into a sport mode, in which the lockout function is disengaged, and the operator is able to shift freely between gears without being encumbered by various lockout controls.

BRIEF SUMMARY

According to various example embodiments of the present general inventive concept, an automatic transmission shifter mechanism that is readily selectable between an automatic transmission mode and a manual shifting mode by a simply lateral movement of a gear shifter when in a drive mode, allowing the operator to manually and easily shift gears up or down when desired.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing an automatic transmission shifter mechanism that is selectable between an automatic transmission mode and a manual shifting mode, including a shifter assembly configured to move in a first range of movement to be positioned in the automatic transmission mode, and to move in a second range of movement to selectively shift gears up and down in the manual shifting mode, a first sensor configured to sense that the shifter assembly is in the automatic transmission mode in response to the shifter assembly being in the first range of movement, and at least a second sensor configured to sense gear changes in the manual shifting mode, wherein the shifter assembly is configured to be selectively moved laterally from the first range of movement to the second range of movement when in a drive mode in the first range of movement.

The foregoing and/or other aspects and advantages of the present general inventive concept may also be achieved by providing an automatic transmission shifter mechanism that is selectable between an automatic transmission mode and a manual shifting mode, including a shifter assembly, a block attached to the shifter assembly, a pin attached to the block, at least one slotted plate which interacts with the shifter assembly, and a detent plate proximate to the block, wherein selected shifter assembly positions in the automatic transmission mode are maintained by the pin being located within a corresponding detent of the detent plate, and wherein a predetermined movement of the shifter assembly causes the pin to move out of range of detents in the detent plate such that an operator can shift freely between drive gears in the manual shifting mode.

The foregoing and/or other aspects and advantages of the present general inventive concept may also be achieved by providing an automatic transmission shifter mechanism that is selectable between an automatic transmission mode and a manual shifting mode, including a shifter assembly, a pin attached to the shifter assembly, a first slotted plate to selectively receive a first portion of the shifter assembly, and a detent plate configured to receive the pin at different gear positions, wherein selected shifter assembly positions in the automatic transmission mode are maintained by the pin being located within a corresponding detent of the detent plate, and wherein movement of the first portion of the shifter assembly into the first slotted plate causes the pin to move out of range of detents in the detent plate such that an operator can shift between drive gears in the manual shifting mode.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
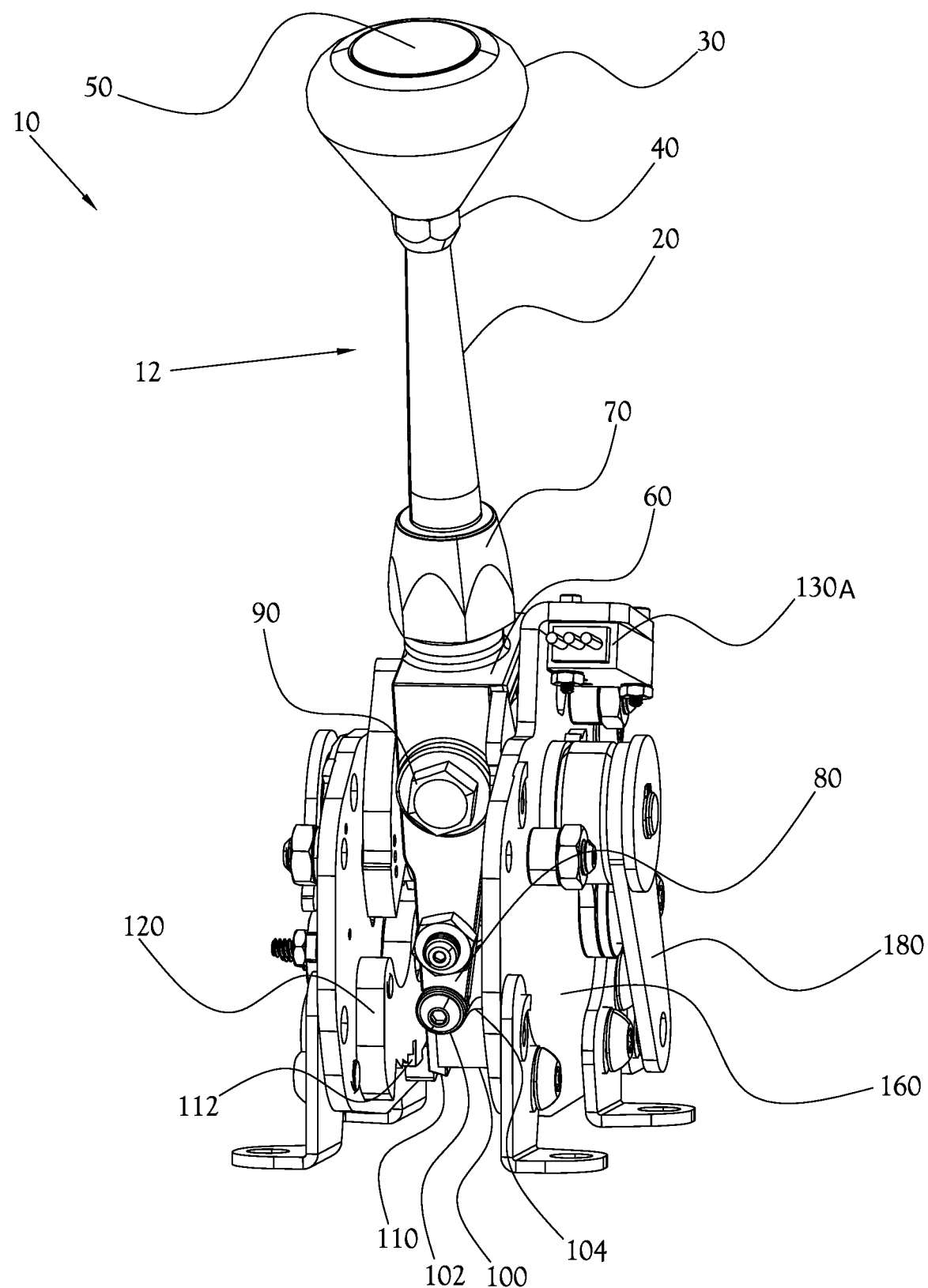
FIG. 1 illustrates a perspective view of an automatic transmission shifter mechanism with a selectable manual shifting function according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various examples of the present general inventive concept provide an automatic transmission shifter mechanism with a selectable manual shift function. In various example embodiments, the shifting mechanism may be used in the normal upright position to shift between the conventional positions in an automatic transmission configuration, and the shifter may be pushed laterally to a manual shifting position to disengage the normal automatic transmission mode. The example embodiments described herein are described with reference to an automatic shifter mechanism of the type having a lockout button integrated in the center of the knob. However, those skilled in the art will recognize that the present general inventive concept may be implemented using a host of other methods and/or configurations to disengage the lockout system to allow manual up and down shifting. In the descriptions of the various example embodiments herein, the automatic transmission mode may be referred to interchangeably by such terms as the normal automatic transmission mode, the normal automatic shifting mode, the normal mode, etc., and the selectable manual shifting mode may be referred to interchangeably by such terms as the manual mode, the manual transmission mode, etc.

Figure 2:
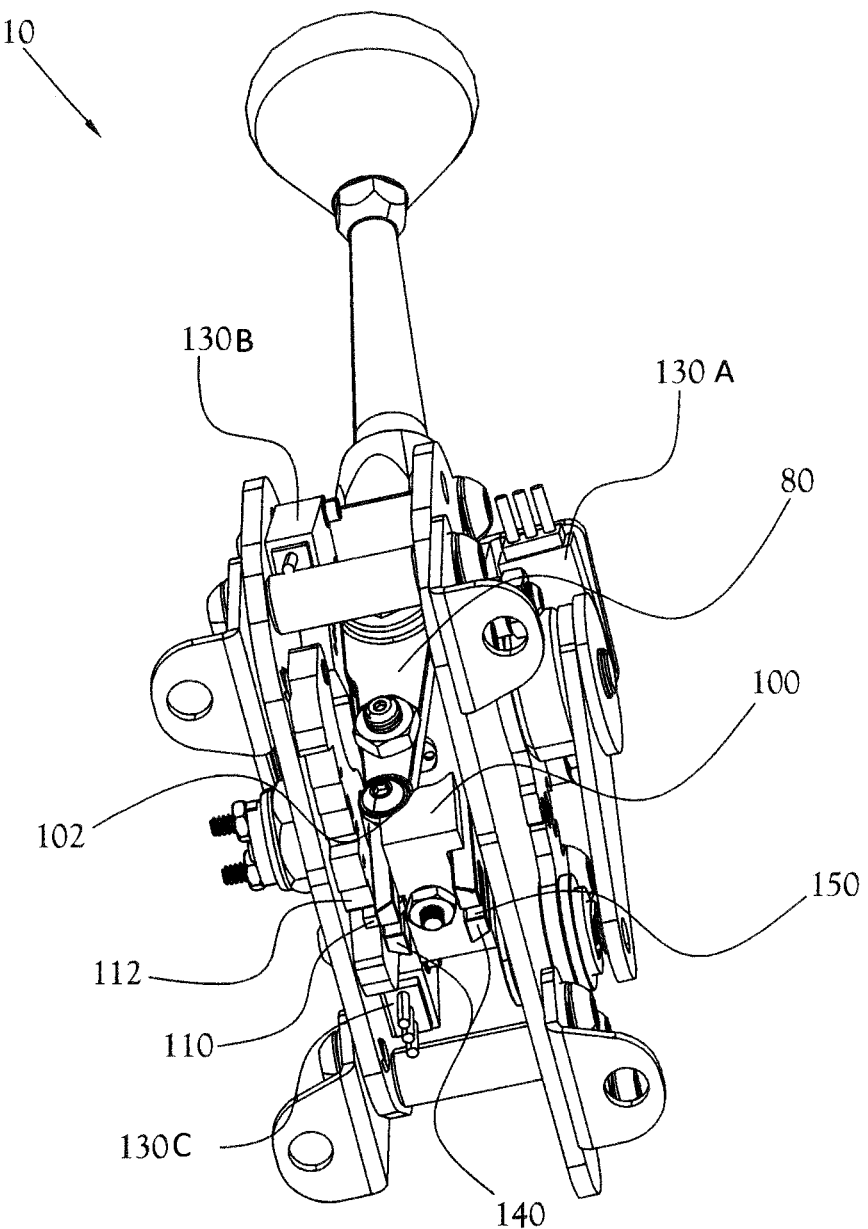
FIG. 2 illustrates a bottom view of the automatic transmission shifter mechanism of FIG. 1.
Figure 3:
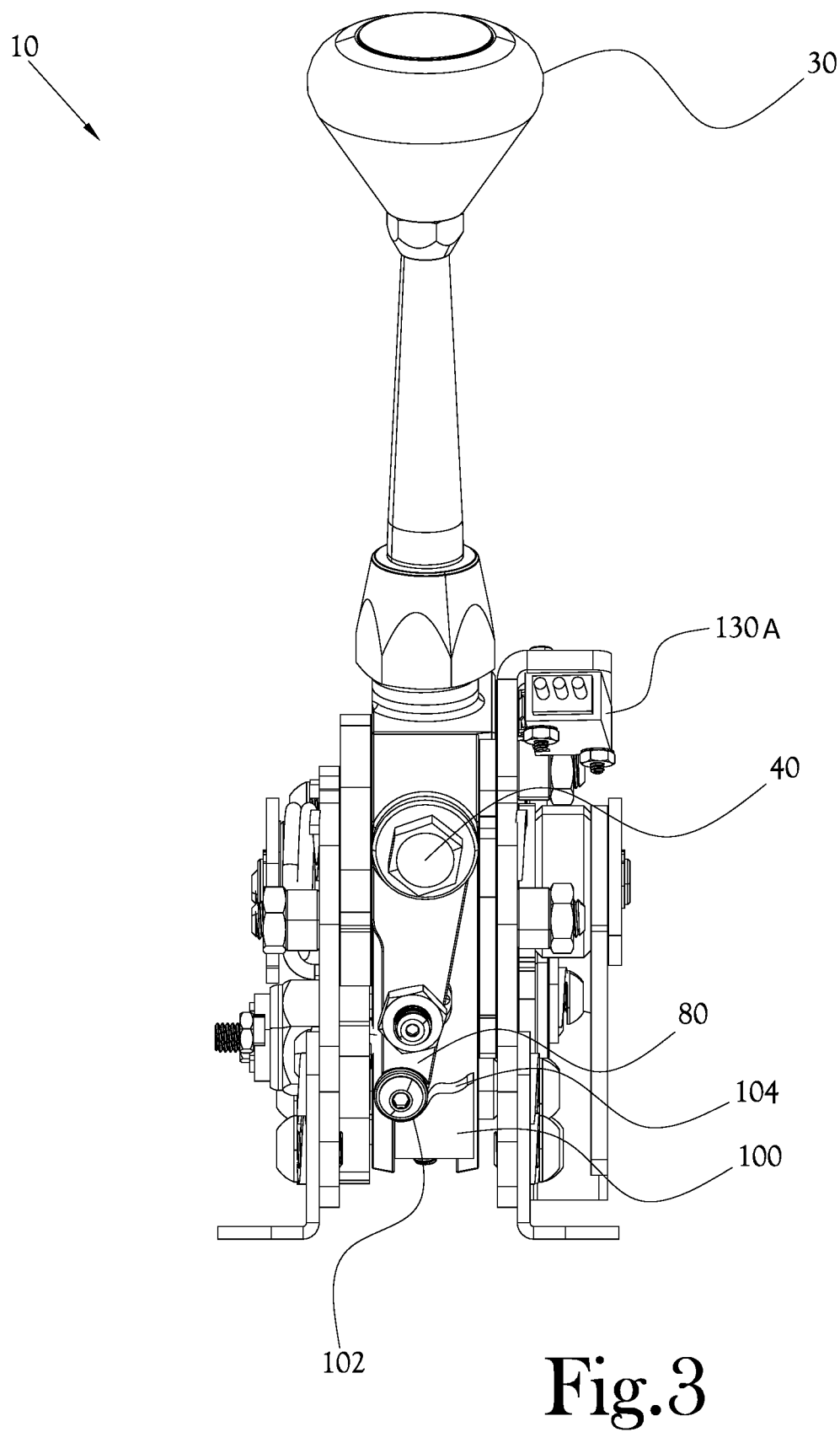
FIG. 3 illustrates a front view of the automatic transmission shifter mechanism of FIG. 1 in the automatic shifting position.

FIG. 1 illustrates a perspective view of an automatic transmission shifter mechanism with a selectable manual shifting function according to an example embodiment of the present general inventive concept, FIG. 2 illustrates a bottom view of the automatic transmission shifter mechanism of FIG. 1, and FIG. 3 illustrates a front view of the automatic transmission shifter mechanism of FIG. 1 in the automatic shifting position. Certain components have been omitted from the illustrations in FIGS. 1 and 3 so that certain other components provided deeper inside the assembly may be seen more clearly. The transmission shifter mechanism illustrated in FIGS. 1-3 is illustrated as being in the normal automatic transmission mode. In the example embodiment illustrated in FIG. 1, an automatic transmission shifter mechanism 10 with a manual shift function includes a shaft 20 having a shifter knob 30 installed thereon by way of an upper nut 40. Integrated with the knob 30 and flush with the top of the knob 30 is the lockout button 50. The shaft 20 is attached to a shifter base 60 by way of a lower nut 70, which is threaded onto a protrusion from the shifter base 60. A lower shaft projection 80 extends downward from a bottom of the shifter base 60, and has a position holding member provided proximate a distal end thereof that is configured to interact with a lower block 100 as described herein. The knob 30, shaft 20, shifter base 60, and lower shaft projection 80 are components of a shifter assembly 12 that are configured to move as one integral unit and rotate about a first pivot point 200 (illustrated in FIG. 5) when operating in a standard automatic transmission mode and when changing gears in the manual shifting mode, and to rotate about a second pivot point 90 centered on the large hexagonal bolt head on the shifter base 60 when moving the shifter into and out of the manual shifting mode. As discussed in more detail herein, in the example embodiment illustrated in FIGS. 1-5 the axis of rotational movement of the shifter assembly 12 into and out of the manual shifting mode is substantially perpendicular to the axis of rotational movement of the shifter assembly 12 when changing gear positions in the normal automatic shifting mode.

The lower block 100 is coupled to a bottom of the shifter assembly 12 proximate the distal end of the lower shaft projection 80. In this example embodiment of the present general inventive concept, the position holding member provided proximate the distal end of the lower shaft projection 80 is configured to project from opposite sides of the lower shaft projection 80 to interact with the lower block 100, and is formed as circular members proximate forward and back distal ends of the lower shaft projection 80 to interact with at least one detent provided in an upper surface of the lower block 100 to hold the shifter assembly 12 in place in the manual shifting mode. In the example embodiment illustrated in FIG. 3, an upper surface of the lower block 100 is configured to have a lower detent 102 and an upper detent 104 with a ridge therebetween. As illustrated in FIG. 3, when the shifter assembly 12 is being operated in the normal automatic mode, the position holding member of the lower shaft projection 80 rests in the lower detent 102. Conversely, when the shifter assembly 12 is being operated in the manual shifting mode, the position holding member of the lower shaft projection 80 will rest in the upper detent 104, which holds the shifter assembly 12 in place in the manual shifting mode as will be described in more detail herein. In various example embodiments of the present general inventive concept, the position holding member of the lower shaft projection 80 may not rest in the lower detent 102 when in the normal automatic mode, and/or the lower detent 102 may not even be provided, as various other structures of the shifter mechanism 10 hold the shifter assembly 12 in the vertical position, i.e., the normal automatic shifting mode, during operation. The position holding member of the lower shaft projection 80 may be configured to operate in register with the upper and lower detents 104,102, and may be configured as a rolling member to aid in a user's movement of the shifter assembly 12 between automatic and manual modes.

As illustrated in FIG. 3, the lower shaft projection 80 is shown in a position resting in register with the lower detent 102 of the lower block 100, which holds the shifter assembly 12 in the normal automatic mode. In various example embodiments of the present general inventive concept, a rod (not shown) may extend through the shaft 20 so as to couple the lockout button 50 to the lower block 100 such that pressing the lockout button 50 will push the lower block 100 downward away from the lower shaft projection 80. A spring mechanism (not shown) within the space between the lockout button 50 and the lower block 100 provides an upward force to keep the lower block 100 biased in the raised, lockout position. By depressing and releasing the lockout button 50, the operator is able to control the downward and upward motion of the lower block 100. As illustrated in FIG. 1, a detent plate 120 is provided in a fixed position generally adjacent to the lower shaft projection 80 and lower block 100. The detent plate 120 is fixed to one of two main side plates 160 that are provided at either side of the shifter mechanism 10 which frames a large portion of the components that are cooperating between the two main side plates 160. A lower block pin 110 is configured to protrude from the lower block 100 in a direction toward the detent plate 120 so as to register with the detents 112 of the detent plate 120, depending upon the position of the shifter assembly 12, while the lockout button 50 is in the raised position. Thus, when the lockout button 50 is not pressed, and therefore the shifter assembly 12 is in lockout mode, accidental shifting from a park position into reverse, or between drive and low gears, etc., may be prevented. By pressing the lockout button 50, lower block 100 and therefore the lower block pin 110 is moved generally downward, away from the detents 112, to "unlock" the shifter and allow the operator to shift gears.

FIG. 2 illustrates a view of the automatic transmission shifter mechanism 10 from the underside. The lower block 100 can be seen with the lower block pin 110 resting within one of the detents 112 of the detent plate 120, and the lower shaft projection 80 is shown in one possible position resting in register with the lower detent 102 of the lower block 100. As illustrated in this example embodiment of the present general inventive concept, two channel guides 140 are provided at the distal end of the lower shaft projection 80, and configured so as to be located along either side of the lower block 100. The lower block pin 110 and a ridge 150 on the opposing side of the lower block 100 rest within the channel guides 140, such that the channel guides 140 restrain the lateral movement of the lower block 100 and position the lower block 100 such that the pin 110 is generally adjacent to the detents 112. As illustrated in FIG. 2, the distal end of the lower shaft projection 80 is generally configured with an open receiving portion in which the lower block 100 rests, and the lower block 100 moves partially out of the receiving portion, and guided by the two channel guides 140 interacting respectively with the lower block pin 110 and ridge 150, when the lockout button 50 is pressed. Thus, in the normal automatic shifting mode, when the shifter assembly 12 is oriented vertically, the position of the shifter assembly 12, and therefore the gear position corresponding to the position of the shifter assembly 12, is determined by which of the detents 112 of the detent plate 120 that the lower block pin 110 is in register. The limits of forward and back movement of the shifter assembly 12 is limited by the terminating edges of the detent plate 120 configured at either end of the detents 112.

FIG. 3 illustrates a front view of the automatic transmission shifter mechanism 10 in which the lower shaft projection 80 is shown in one possible position resting in register with the lower detent 102 of the lower block 100. In this position, the vehicle is in normal automatic transmission mode, and the operator is required to disengage the lockout in order to shift freely from a park position into reverse, neutral, drive, and low gears. In this mode, the lower block pin 110 is engaged with one of the corresponding detents 112 in any of the park, reverse, neutral, drive, and low gear positions.

A plurality of electronic shifter modules 130A,130B, 130C are provided to control various operations of gear shifting in automatic and manual modes. In the example embodiment of the present general inventive concept illustrated in FIGS. 1-3, a first electronic shifter module 130A is provided proximate a top portion of one of the main side plates 160. The first electronic shifter module 130A of this example embodiment is configured to sense when the shifter assembly 12 is in the normal automatic mode or the manual shifting mode. In various example embodiments, the first electronic shifter module 130A is configured to have a switch that is closed to indicate that the shifter module 130 is in the vertical position, i.e., the normal automatic mode. The example embodiment illustrated in FIGS. 1-3 may include a first electronic shifter module 130A that includes a biased member that is biased in the direction of the shifter base 60, and wherein contact between the shifter base 60 and the biased member presses a button to actuate the switch to indicate the normal automatic mode. The biased member may be provided with a rolling member to maintain contact between the fixed first electronic shifter module 130A and the adjacent side of the shifter base 60 during rotational movement of the shifter base 60 during normal movement of the shifter assembly 12. Axles provided to the rolling member may provide the force to push a button that actuates the switch of the first electronic shifter module 130A indicating the normal automatic mode. When the shifter assembly 12 is moved to the manual shifting position, as discussed herein in regard to FIGS. 4-5, contact between the shifter base 60 and the biased member of the first electronic shifter module 130A is lost, opening the aforementioned switch and indicating that the operator has selected the manual shifting position. The electronic shifter modules 130A,130B,130C are illustrated with attached cable leads.

Figure 4:
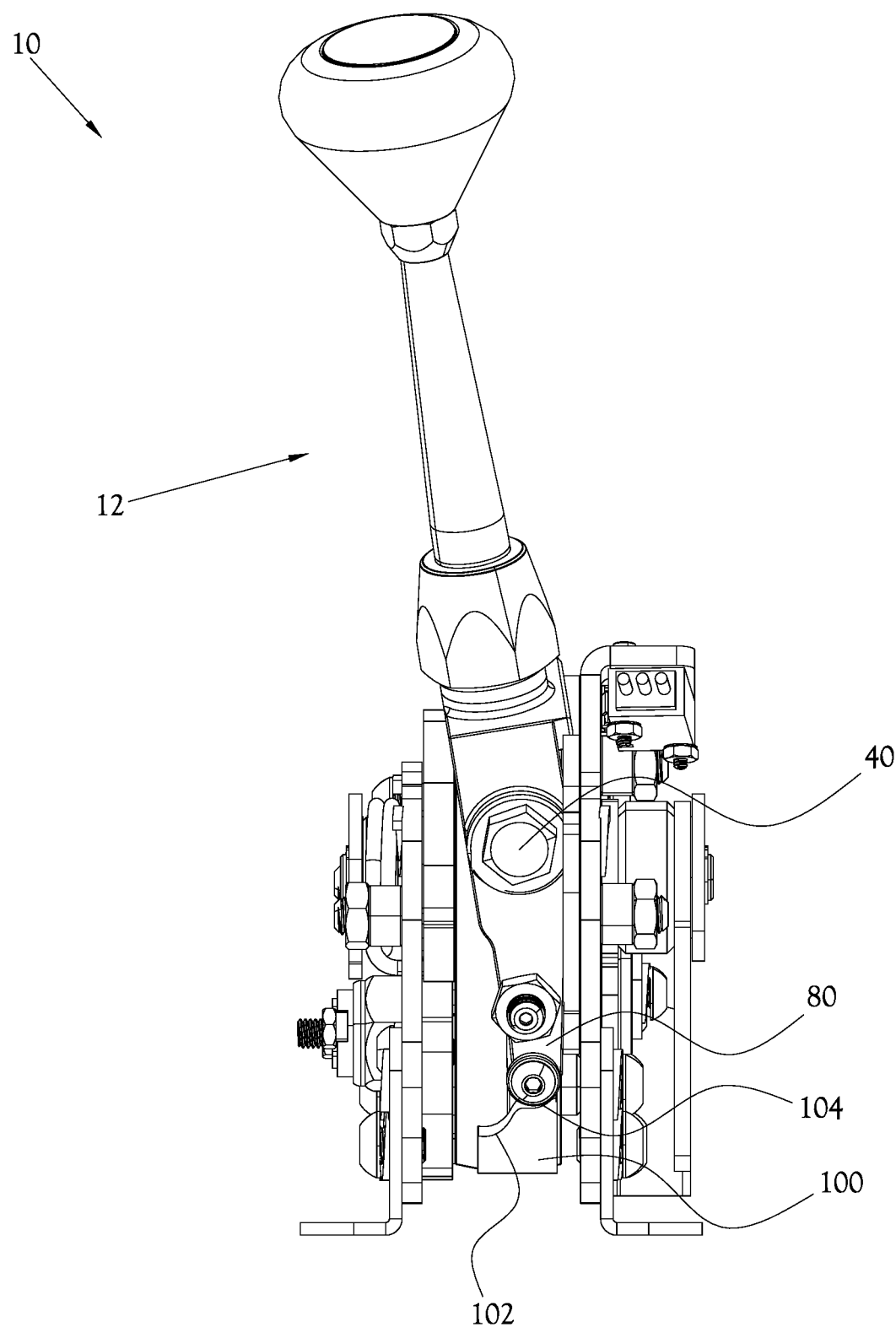
FIG. 4 illustrates a front view of the automatic transmission shifter mechanism of FIG. 1 in the manual shifting position.
Figure 5:
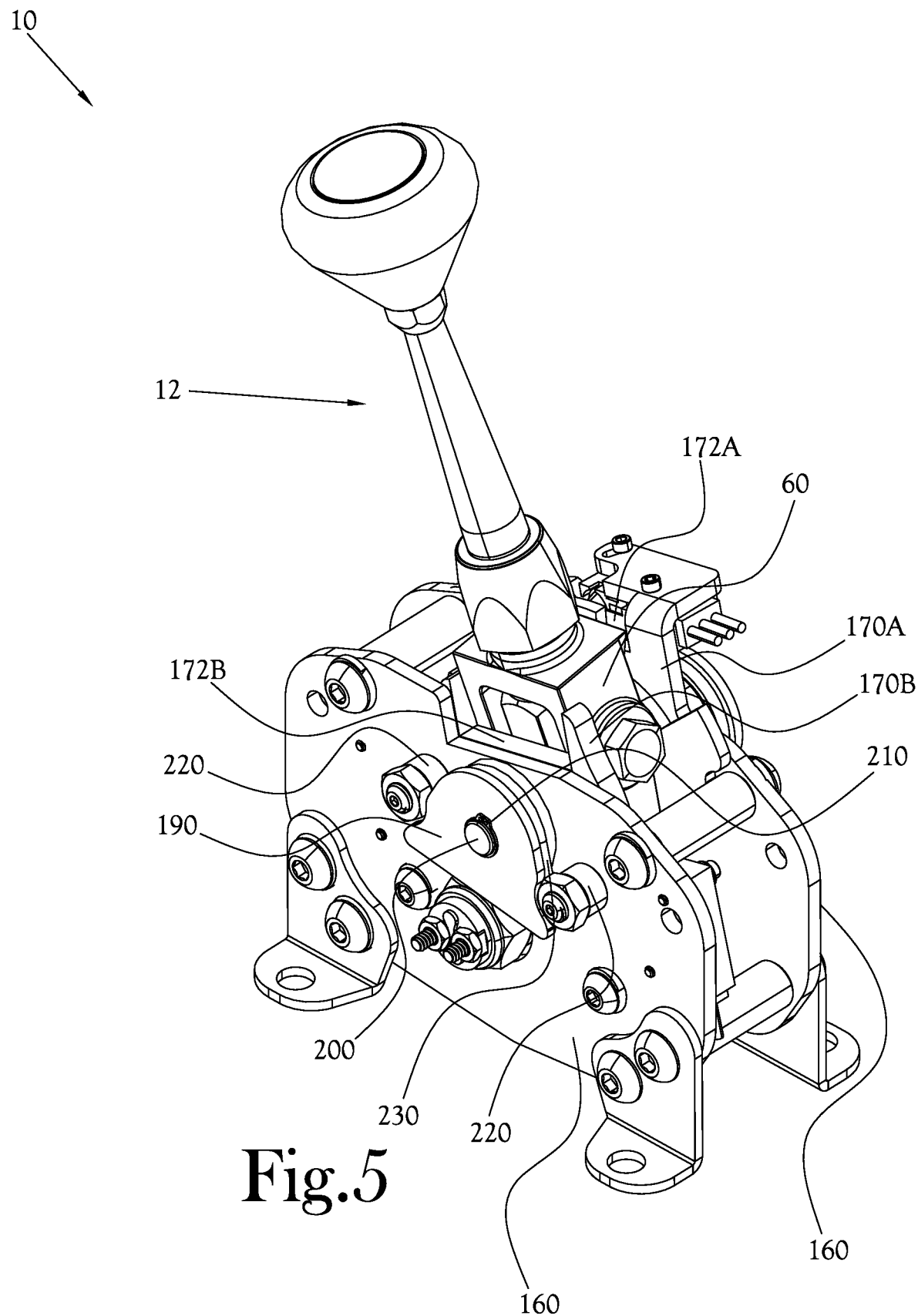
FIG. 5 illustrates a perspective view of the automatic transmission shifter mechanism of FIG. 1 in the manual shifting position.

FIG. 4 illustrates a front view of the automatic transmission shifter mechanism of FIG. 1 in the manual shifting position, and FIG. 5 illustrates a perspective view of the automatic transmission shifter mechanism of FIG. 1 in the manual shifting position. As illustrated in FIGS. 4-5, to selectively change the shifter mechanism 10 from the normal automatic mode to the manual shifting mode the operator simply moves the shifter assembly 12 laterally, in a direction away from the first electronic shifter module 130A in this example embodiment, to a manual shifting position. In this example embodiment of the present general inventive concept, the shifter assembly 12 can only be moved to the manual shifting position when the transmission is in overdrive. As illustrated in FIG. 4, the shifter assembly 12, which was positioned in overdrive immediately before being moved laterally to the manual shifting position, has been moved by moving the shifter knob 30 in a direction away from the first electronic shifter module 130A. As a result, the position holding member provided proximate the distal end of the lower shaft projection 80 has been moved into register with the upper detent 104 of the lower block 100. Because the position of the position holding member is fixed at a point on the lower shaft projection 80, and the lower block 100 is coupled to the distal end of the lower shaft projection 80 in a biased and movable configuration, the register between the position holding member and the upper detent 104 causes the lower block 100 to become disengaged with the detents 112 of the detent plate 120 in the same manner as if the lockout button 50 had been pressed, and that position will be maintained as long as the shifter assembly 12 is in the manual shifting position. By moving the shifter knob 30 in the direction away from the first electronic shifter module 130A, the shifter assembly 12 rotates around the second pivot point 90 and the lower shaft projection 80 moves in the opposite direction, towards the upper detent 104 of the lower block 100. This action forces the lower block 100 and lower block pin 110 in a downward direction away from the detents 112. The shifter assembly 12 is thus no longer constrained in the normal automatic shifting position, and is able to shift freely between gears through interaction with the second and third electronic shifter modules 130B,130C as discussed herein. This manual shifting mode may be referred to as the sport mode.

As illustrated FIG. 5, in this example embodiment first and second slotted plates 170A,170B are provided respectively inside and adjacent the two main side plates 160 of the shifter mechanism 10. The first slotted plate 170A is provided between the shifter base 60 and the main side plate 160 adjacent the first electronic shifter module 130A, and the second slotted plate 170B is provided between the shifter base 60 and the main side plate 160 on the side opposite the first slotted plate 17A. Each of the first and second slotted plates 170A,170B are respectively configured with receiving slots 172A,172B that are configured to receive at least a portion of the shifter base 60. The width of the receiving slots 172A,172B are configured to receive a portion of the shifter base 60 in substantially a slip fit so as to reduce any "play" between the shifter base 60 and edges of the slots 172A,172B. Generally, the width of the slots 172A,172B are substantially the same size as the distance between the forward and back surfaces of the shifter base 60, and just large enough so that the shifter base 60 can move freely in a lateral direction between the slots when the shifter assembly 12 is rotated from the normal automatic transmission mode into the manual shifting mode, and vice versa.

When the shifter assembly 12 is in the normal automatic mode, the shifter assembly 12 is substantially vertical and the shifter base 60 is received in the slot 172A of the first slotted plate 170A. The first slotted plate 170A is configured to rotate about the first pivot point 200 to interact with the automatic transmission linkage 180 to allow the operator to move the vehicle between park, neutral, drive, etc. As previously noted, the shifter base 60 causes the first electronic shifter module 130A to sense the normal automatic mode when the shifter base 60 is received in the slot 172A. When the operator selects the manual shifting mode by moving the shifter assembly 12 laterally, the shifter base 60 moves out of the slot 172A and into the slot 172B of the second slotted plate 170B. This rotation from normal mode into manual mode is only possible from one position within the normal automatic transmission mode, that is, when the shifter base 60 is lined up directly within the slot 172B in the second slotted plate 170B. In an example embodiment of the invention, that position within the normal automatic transmission mode would be overdrive. In any other position, the shifter base 60 would not be lined up directly within the slot 172B of the second slotted plate 170B, and the second slotted plate 170B would prohibit the shifter base 60 from moving into the slot 172B corresponding to the manual shifting mode.

FIG. 1 illustrates the automatic transmission linkage 180 attached to one of the main side plates 160. The automatic transmission linkage 180 is connected by way of a series of gears (not shown) to the first slotted plate 170A. As previously described, when the shifter assembly 12 is in the normal automatic transmission mode and the shifter base 60 is in the slot 172A of the first slotted plate 170A, movement of the shifter assembly 12 in the fore/aft position drives the automatic transmission linkage 180. When the shifter assembly 12 is in the manual shifting mode and the shifter base 60 is in the slot 172B of the second slotted plate 170B, the second slotted plate 170B is configured to act as a rocker plate to control the movement of the shifter assembly 12. The second slotted plate 170B is also configured to rotate about the first pivot point 200, like the first second slotted plate 170A. However, the first and second slotted plates 170A,170B are configured to rotate independently of one another. In the manual shifting mode, the shifter assembly 12 can be pushed forward to move up a gear, and can be pulled back to move down a gear. The forward and backward movement of the second slotted plate 170B, which moves in register with the shifter assembly 12 in the manual shifting mode, is limited by stopping members provided at an inner surface of the main side plate 160 adjacent the second slotted plate 170B. In this example embodiment, the second slotted plate 170B is biased in both the forward and back directions to maintain a centered position which will receive the shifter base 60 in the slot 172B, and which will allow the shifter assembly 12 to be moved such that the shifter base 60 moves immediately into the slot 172A of the first slotted plate 170A. In this example embodiment, the second slotted plate 170B is biased by wound spring 230 provided at an outer surface of the main side plate 160 adjacent the second slotted plate 170B. The wound spring 230, which is held in place by a spring plate 190 that may interact with two protrusions 220 provided on the outer surface of the main side plate 160, is configured such that both respective ends are bent to enter slots in the main side plate to contact corresponding spring receiving portions (such as, for example, detents in the outer edge) of the second slotted plate 170B to bias the second slotted plate 170B in forward and back directions. The slots are elongated and curved to allow the bias to be overcome by the operator's movement of the shifter assembly 12 in the forward and back directions, but to stop movement at a predetermined terminal position in each direction. Thus, for example, moving the shifter assembly 12 forward to move up one gear pushes against an end of the spring that is biasing the shifter assembly 12 in the backward direction, and the forward movement will be stopped when the spring contacts the end of the slot through which the spring extends. Similarly, when the spring moves the shifter assembly 12 back to the centered position, the spring will stop movement by the backward bias portion of the spring when that portion meets the other end of the slot through which the spring extends. In various example embodiments, the spring plate 190 is attached to the adjacent main side plate 160 by a rod centered on the first pivot point 200 and secured in place with a mechanical locking mechanism 210. The rod 200 extends through the main side plate 160 and through the shifter assembly to reach the first slotted plate 170A at the first pivot point 200.

In the example embodiments illustrated in these drawings, second and third electronic shifter modules 130B,130C are provided adjacent the main side plate 160 that is adjacent the second slotted plate 170B to sense up and down shifting in the manual shifting mode. As illustrated in FIG. 2, the second electronic shifter module 130B is provided proximate a forward inner surface of the main side plate adjacent to second slotted plate 170B, and is configured to sense the forward movement of the shifter assembly 12 in the manual shifting mode. In this example embodiment, the second electronic shifter module 130B is configured such that contact from the second slotted plate 170B when rotated forward closes a switch indicating the forward position of the shifter assembly 12. Similar to the configuration of the first electronic shifter module 130A, the second electronic shifter module 130B may include a biased rolling member that maintains contact with a forward outer edge of the second slotted plate 170B, but such that only forward rotation of the second slotted plate 170B to the terminal point causes the rolling member to be pushed toward a button to actuate the switch. In such a configuration, the forward outer edge of the second slotted plate 170B may be contoured such that contact with the rolling member of the second electronic shifter module 130B may be maintained, but not sufficiently pressed until the "rocker plate" has been rotated forward to the terminal point to indicate a gear change. In various example embodiments, the second slotted plate 170B may be a cam configured to actuate such contact. Similarly, the third electronic shifter module 130C, which is provided proximate a back inner surface of the main side plate adjacent to second slotted plate 170B, may include a biased rolling member that maintains contact with a back outer edge of the second slotted plate 170B, but such that only backward rotation of the second slotted plate 170B to the terminal point causes the rolling member to be pushed toward a button to actuate the switch. In such a configuration, the back outer edge of the second slotted plate may be contoured such that contact with the rolling member of the third electronic shifter module 130C may be maintained, but not sufficiently pressed until the "rocker plate" has been rotated backward to the terminal point. Release of the shifter assembly 12 back into the central position releases pressure on the corresponding buttons or other such contact sensors. Thus, electronic sensing of the operator's shifting of the shifter assembly 12 forward and backward in the manual shifting mode causes electronic control of the corresponding gear changes. In this example embodiment, each of the electronic shifter modules 130A,130B,130C contains a button (not shown) which, when depressed, communicates with an electronic controller to affect the gear and/or mode changes.

When the shifter assembly 12 is in normal automatic transmission mode, the shifter base 60 is not in the slot 172B of the second slotted plate 170B, and movement of the shifter assembly 12 does not engage the second and third electronic modules 130B,130C, which are fore and aft of the second slotted plate 170B, and the buttons on the two electronic modules 130 remained in their neutral, non-depressed state. Additionally, when the shifter assembly 12 is in normal automatic transmission mode, the shifter base 60 causes the button on the first electronic module 130A to sense and indicate the normal automatic mode to the electronic controller.

Figure 6:
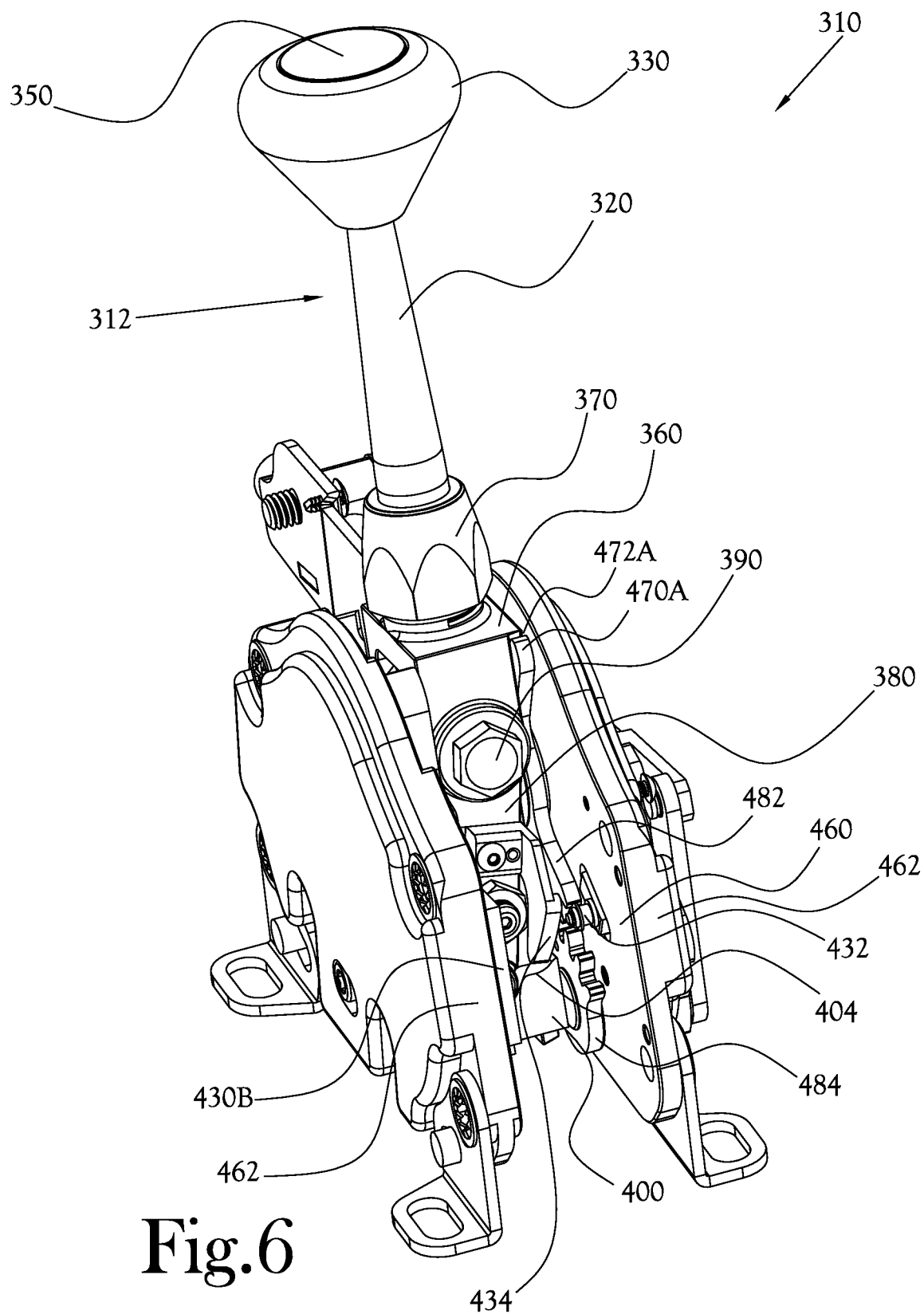
FIG. 6 illustrates a perspective view of an automatic transmission shifter mechanism with a selectable manual shifting function according to another example embodiment of the present general inventive concept.
Figure 7:
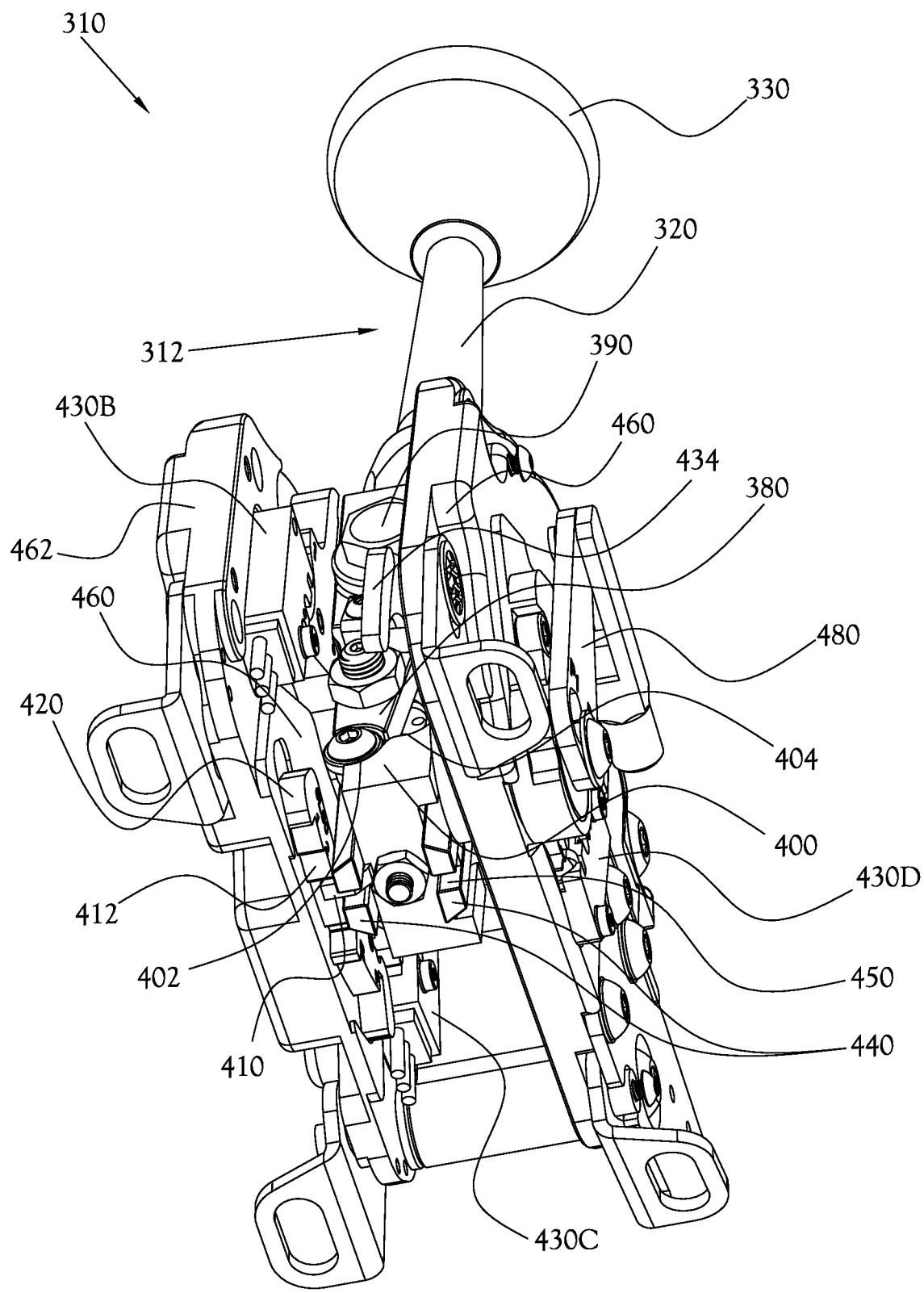
FIG. 7 illustrates a bottom view of the automatic transmission shifter mechanism of FIG. 6.
Figure 8:
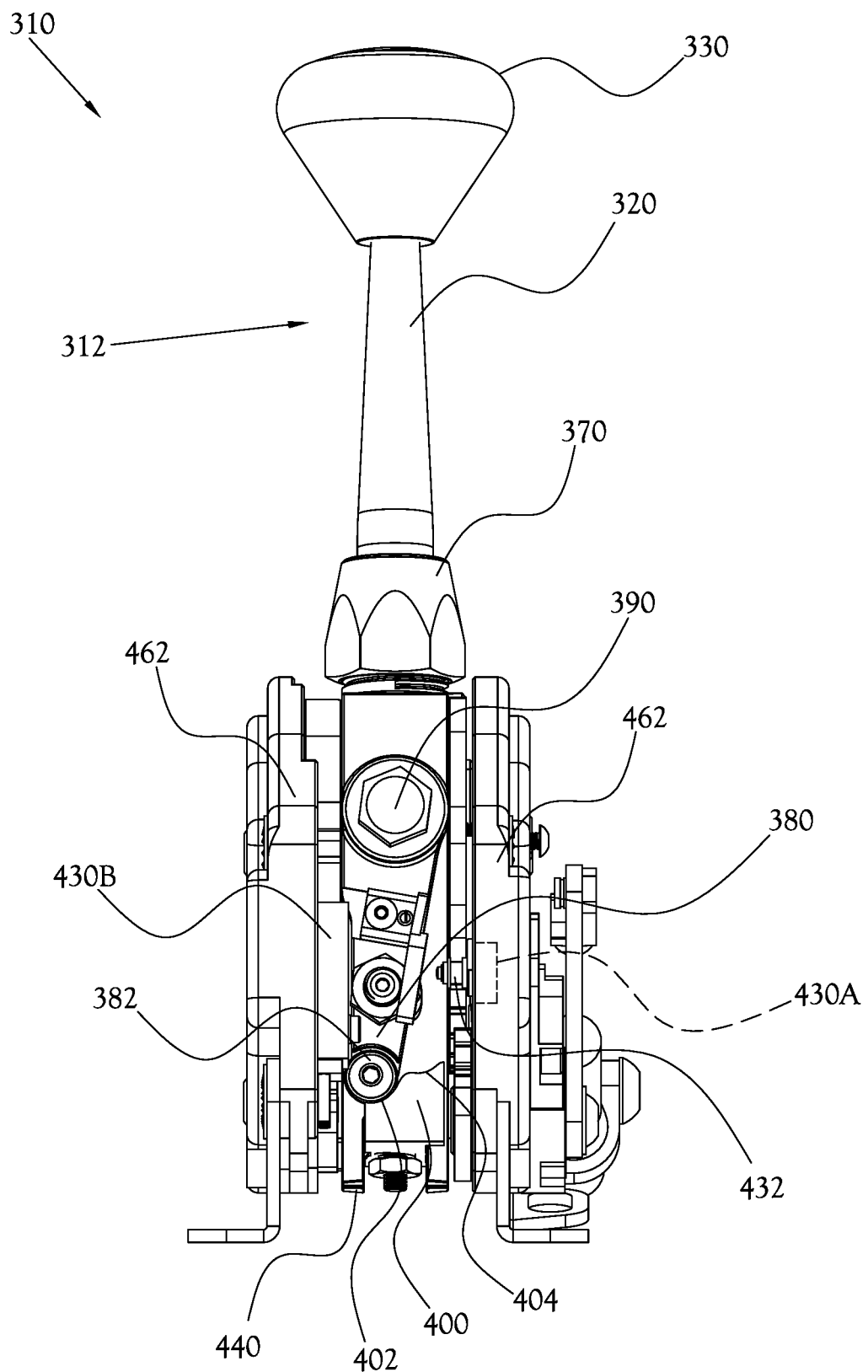
FIG. 8 illustrates a front view of the automatic transmission shifter mechanism of FIG. 6 in the automatic shifting position.

Various example embodiments of the present general inventive concept may include one or more features in place of, and/or in conjunction with, several of the feature already discussed without departing from the scope of the present general inventive concept. For example, various example embodiments may include shifter mechanisms with electronic shifter modules that sense the manual mode by being actuated, include additional electronic shifter modules that may control signals such as a reverse light, and so on. These and other features are described herein in relation to FIGS. 6-11. FIG. 6 illustrates a perspective view of an automatic transmission shifter mechanism with a selectable manual shifting function according to another example embodiment of the present general inventive concept, FIG. 7 illustrates a bottom view of the automatic transmission shifter mechanism of FIG. 6, and FIG. 8 illustrates a front view of the automatic transmission shifter mechanism of FIG. 6 in the automatic shifting position. Certain components have been omitted from the illustrations in some of FIGS. 6 through 11 so that certain other components provided deeper inside the assembly may be seen more clearly. The transmission shifter mechanism illustrated in FIGS. 6-8 is illustrated as being in the normal automatic transmission mode. In the example embodiment illustrated in FIG. 6, an automatic transmission shifter mechanism 310 with a manual shift function includes a shaft 320 having a shifter knob 330 installed thereon. Integrated with the knob 330, and substantially flush with the top of the knob 330, is the lockout button 350. The shaft 320 is attached to a shifter base 360 by way of a lower nut 370, which is threaded onto a protrusion from the shifter base 360. A lower shaft projection 380 extends downward from a bottom of the shifter base 360, and has a position holding member 382 provided proximate a distal end thereof that is configured to interact with a lower block 400 as described herein. The knob 330, shaft 320, shifter base 360, and lower shaft projection 380 are components of a shifter assembly 312 that is configured to move as one integral unit and rotate about a first pivot point 500 (illustrated in FIG. 10) when operating in a standard automatic transmission mode and when changing gears in the manual shifting mode, and to rotate about a second pivot point 390 centered on the large hexagonal bolt head on the shifter base 360 when moving the shifter into and out of the manual shifting mode. As discussed in more detail herein, in the example embodiment illustrated in FIGS. 6-11 the axis of rotational movement of the shifter assembly 312 into and out of the manual shifting mode is substantially perpendicular to the axis of rotational movement of the shifter assembly 312 when changing gear positions in the normal automatic shifting mode.

The lower block 400 is coupled to the bottom of the shifter assembly 312 proximate the distal end of the lower shaft projection 380. In this example embodiment of the present general inventive concept, the position holding member 382 provided proximate the distal end of the lower shaft projection 380 is configured to project from opposite sides of the lower shaft projection 380 to interact with the lower block 400, and is formed as circular members proximate forward and back distal ends of the lower shaft projection 380 to interact with at least one detent provided in an upper surface of the lower block 400 to hold the shifter assembly 312 in place in the manual shifting mode. In the example embodiment illustrated in FIG. 8, an upper surface of the lower block 400 is configured to have a lower detent 402 and an upper detent 404 with a ridge therebetween. As illustrated in FIG. 8, when the shifter assembly 312 is being operated in the normal automatic mode, the position holding member 382 of the lower shaft projection 380 rests in the lower detent 402. Conversely, when the shifter assembly 312 is being operated in the manual shifting mode, the position holding member 382 of the lower shaft projection 380 will rest in the upper detent 404, which holds the shifter assembly 312 in place in the manual shifting mode as will be described in more detail herein. In various example embodiments of the present general inventive concept, the position holding member 382 of the lower shaft projection 380 may not rest in the lower detent 402 when in the normal automatic mode, and/or the lower detent 402 may not even be provided, as various other structures of the shifter mechanism 310 may hold the shifter assembly 312 in the vertical position, i.e., the normal automatic shifting mode, during operation. The position holding member 382 of the lower shaft projection 380 may be configured to operate in register with the upper and lower detents 404,402, and may be configured as a rolling member to aid in a user's movement of the shifter assembly 312 between automatic and manual modes.

As illustrated in FIG. 8, the lower shaft projection 380 is shown in a position resting with the position holding member 382 in register with the lower detent 402 of the lower block 400, which holds the shifter assembly 312 in the normal automatic mode. In various example embodiments of the present general inventive concept, a rod (not shown) may extend through the shaft 320 so as to couple the lockout button 350 to the lower block 400 such that pressing the lockout button 350 will push the lower block 400 downward away from the lower shaft projection 380. A spring mechanism (not shown) within the space between the lockout button 350 and the lower block 400 provides an upward force to keep the lower block 400 biased in the raised, lockout position. By depressing and releasing the lockout button 350, the operator is able to control the downward and upward motion of the lower block 400. As illustrated in FIG. 7, a detent plate 420 is provided in a fixed position generally adjacent to the lower shaft projection 380 and lower block 400. The detent plate 420 is fixed to one of two main side plates 460 that are provided at either side of the shifter mechanism 310 which frames a large portion of the components that are cooperating between the two main side plates 460. In various example embodiments, including the example embodiment illustrated in FIGS. 6-11, the two main side plates 460 may be inner most wall portions of side casings 462 that house various components of the shifter mechanism 310, and may be referred to as inner surfaces 460 of the side casings 462. A lower block pin 410 is configured to protrude from the lower block 400 in a direction toward the detent plate 420 so as to register with the detents 412 formed along the bottom of the detent plate 420, depending upon the position of the shifter assembly 312, while the lockout button 350 is in the raised position. Thus, when the lockout button 350 is not pressed, and therefore the shifter assembly 312 is in lockout mode, accidental shifting from a park position into reverse, or between drive and low gears, etc., may be prevented. By pressing the lockout button 350, lower block 400, and therefore the lower block pin 410, is moved generally downward, away from the detents 412, to "unlock" the shifter and allow the operator to shift gears.

FIG. 7 illustrates a view of the automatic transmission shifter mechanism 310 from the underside. The lower block 400 can be seen with the lower block pin 410 resting within one of the detents 412 of the detent plate 420, and the lower shaft projection 380 is shown in one possible position resting in register with the lower detent 402 of the lower block 400. As illustrated in this example embodiment of the present general inventive concept, two channel guides 440 are provided at the distal end of the lower shaft projection 380, and configured so as to be located along either side of the lower block 400. The lower block pin 410 and a ridge 450 on the opposing side of the lower block 400 rest within the channel guides 440, such that the channel guides 440 restrain the lateral movement of the lower block 400 and position the lower block 400 such that the pin 410 is generally adjacent to the detents 412. As illustrated in FIG. 7, the distal end of the lower shaft projection 380 is generally configured with an open receiving portion in which the lower block 400 rests, and the lower block 400 moves partially out of the receiving portion, and guided by the two channel guides 440 interacting respectively with the lower block pin 410 and ridge 450, when the lockout button 350 is pressed. Thus, in the normal automatic shifting mode, when the shifter assembly 312 is oriented vertically, the position of the shifter assembly 312, and therefore the gear position corresponding to the position of the shifter assembly 312, is determined by which of the detents 412 of the detent plate 420 that the lower block pin 410 is in register. The limits of forward and back movement of the shifter assembly 312 is limited by the terminating edges of the detent plate 420 configured at either end of the detents 412.

FIG. 8 illustrates a front view of the automatic transmission shifter mechanism 310 in which the lower shaft projection 380 is shown in one possible position resting in register with the lower detent 402 of the lower block 400. In this position, the vehicle is in normal automatic transmission mode, and the operator is required to disengage the lockout in order to shift freely from a park position into reverse, neutral, drive, and low gears. In this mode, the lower block pin 410 is engaged with one of the corresponding detents 412 in any of the park, reverse, neutral, drive, and low gear positions.

Figure 9:
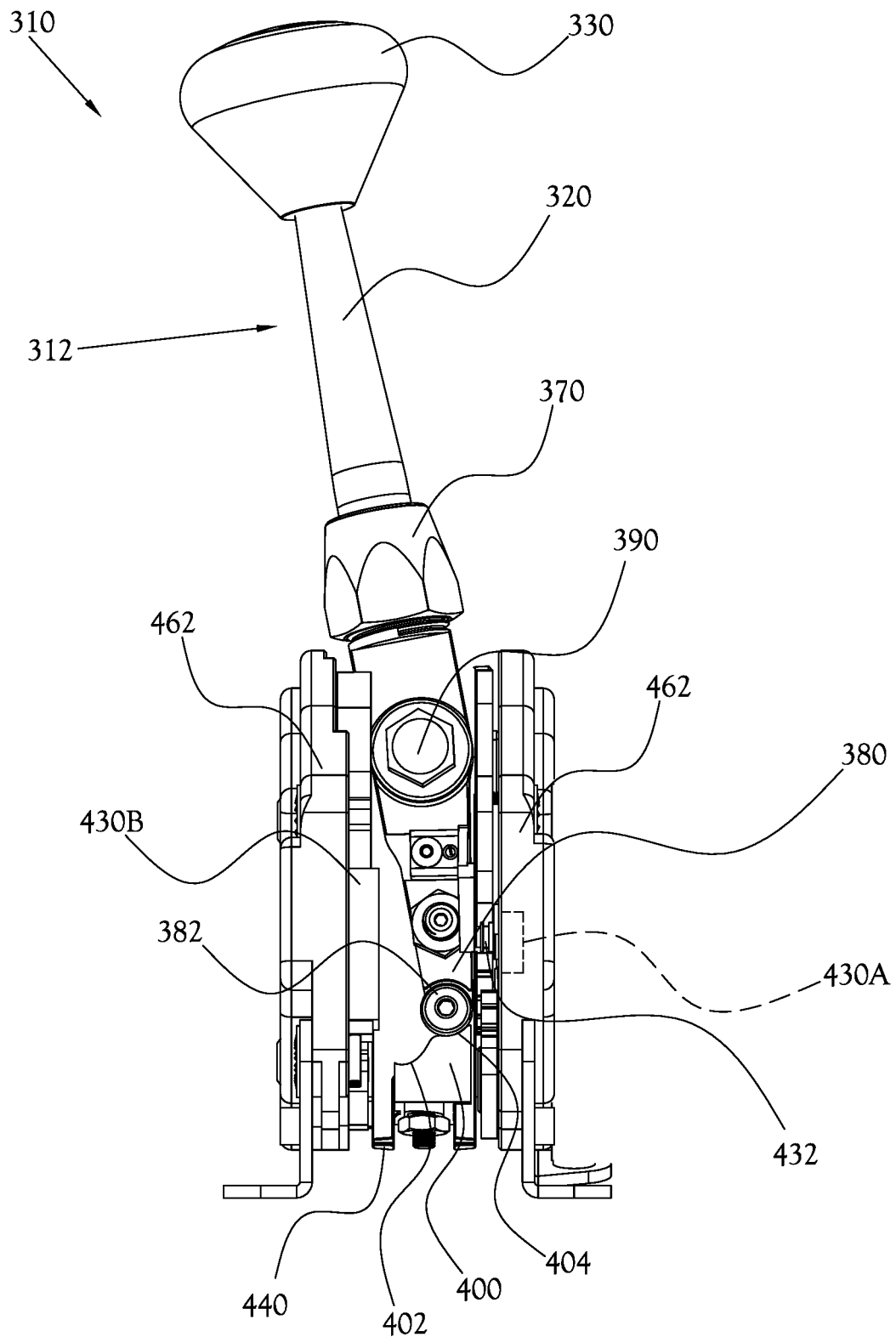
FIG. 9 illustrates a front view of the automatic transmission shifter mechanism of FIG. 6 in the manual shifting position.
Figure 10:
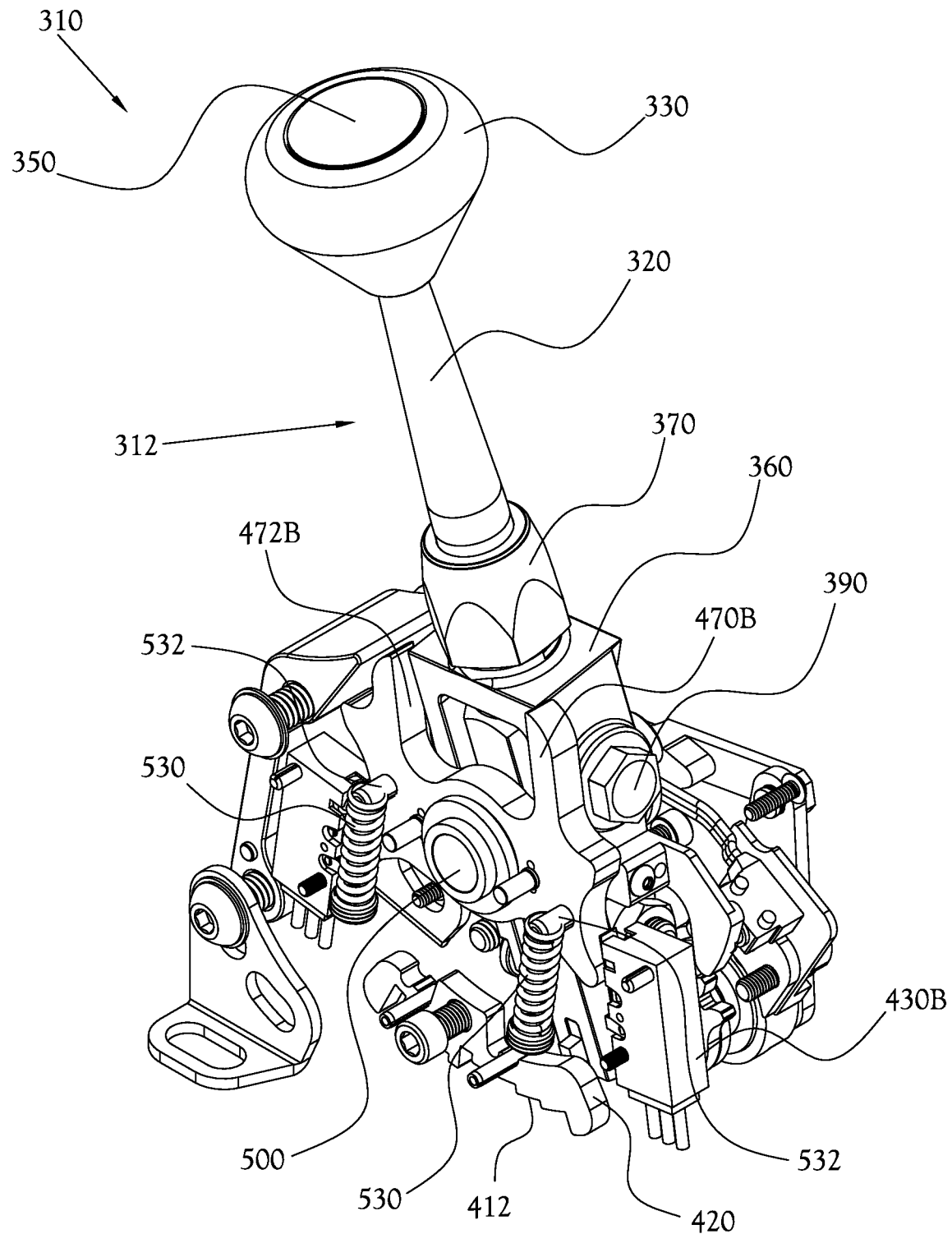
FIG. 10 illustrates a partial perspective view of the automatic transmission shifter mechanism of FIG. 6 in the manual shifting position.

A plurality of electronic shifter modules 430A,430B, 430C,430D are provided to control various operations of gear shifting in automatic and manual modes. In the example embodiment of the present general inventive concept illustrated in FIGS. 6-8, a first electronic shifter module 430A is provided in the side casing 462 opposite the detent plate 420, with a button switch 432, or manual mode switch 432, extending through the side plate 460 of the side casing 462 housing the first electronic shifter module 430A. The button switch 432 of the first electronic shifter module 430A is pressed by a manual mode activation member 434 that extends from a front of the lower shaft projection 380 when the shifter assembly 312 is moved to the manual shifting mode. The manual mode activation member 434 projects from the lower shaft projection 380 in such a way that it does not contact the button switch 432 of the first electronic shifter module 430A when the shifter assembly 312 is in the normal automatic mode, but maintains contact with the button switch 432 of the first electronic shifter module 430A even during shifting motions when the shifter assembly 312 is in the manual shifting mode. In this example embodiment of the present general inventive concept, the manual mode activation member projects forward from a bracket attached to the lower shaft projection 380. Thus, while the first electronic shifter module 130A in FIGS. 1-5 is configured to have a switch that is closed to indicate that the shifter assembly 12 is in the vertical position, i.e., the normal automatic mode, the first electronic shifter module 430A in the example embodiment illustrated in FIGS. 6-11 is configured to have a switch that is closed to indicate that the shifter module 312 is moved away from the vertical position, i.e., in the manual shifting mode. This interaction is illustrated in FIGS. 9-10. Various example embodiments may include a first electronic shifter module 430A that includes a biased member, such as a roller on a leaf spring, that is biased in the direction of the activation member 434, and wherein contact between the activation member 434 and the biased member maintains activating pressure on the button switch 432 to indicate the manual shifting mode during up and down shifting. When the shifter assembly 312 is moved to the normal automatic mode position, as discussed herein in regard to FIGS. 6-8, contact between the manual mode activation member 434 and the button switch 432 of the first electronic shifter module 430A is lost, opening the switch and indicating that the operator has selected the normal automatic position. The electronic shifter modules 430A, 430B,430C,430D are illustrated with attached cable leads.

FIG. 9 illustrates a front view of the automatic transmission shifter mechanism 310 of FIG. 6 in the manual shifting position, and FIG. 10 illustrates a perspective view of the automatic transmission shifter mechanism 310 of FIG. 6 in the manual shifting position. As illustrated in FIGS. 9-10, to selectively change the shifter mechanism 310 from the normal automatic mode to the manual shifting mode the operator simply moves the shifter assembly 312 laterally, in a direction away from the side casing 462 housing the first electronic shifter module 130A in this example embodiment, to a manual shifting position. In this example embodiment of the present general inventive concept, the shifter assembly 312 can only be moved to the manual shifting position when the transmission is in overdrive. As illustrated in FIG. 9, the shifter assembly 312, which was positioned in overdrive immediately before being moved laterally to the manual shifting position, has been moved by moving the shifter knob 330 in a direction away from the side casing 462 housing the first electronic shifter module 430A. As a result, the position holding member 382 provided proximate the distal end of the lower shaft projection 380 is moved into register with the upper detent 404 of the lower block 400, and the manual mode activation member 434 is moved to actuate the button switch 432 of the first electronic shifter module 430A. Because the position of the position holding member 382 is fixed at a point on the lower shaft projection 380, and the lower block 400 is coupled to the distal end of the lower shaft projection 380 in a biased and movable configuration, the register between the position holding member 382 and the upper detent 404 causes the lower block 400 to become disengaged with the detents 412 of the detent plate 420 in the same manner as if the lockout button 350 had been pressed, and that position will be maintained as long as the shifter assembly 312 is in the manual shifting position. By moving the shifter knob 330 in the direction away from the side casing 462 housing the first electronic shifter module 430A, the shifter assembly 312 rotates around the second pivot point 390 and the lower shaft projection 380 moves in the opposite direction, towards the upper detent 404 of the lower block 400. This action forces the lower block 400 and lower block pin 410 in a downward direction away from the detents 412. The shifter assembly 312 is thus no longer constrained in the normal automatic shifting position, and is able to shift freely between gears through interaction with the second and third electronic shifter modules 430B,430C as discussed herein. This manual shifting mode may be referred to as the sport mode.

As illustrated FIG. 10, in this example embodiment first and second slotted plates 470A,470B are provided respectively inside and adjacent the two inner side plates 460 of the side casings 462. The first slotted plate 470A is provided between the shifter base 360 and the inner side plate 460 of the side casing 462 housing the first electronic shifter module 430A, and the second slotted plate 470B is provided between the shifter base 360 and the inner side plate 460 on the side opposite the first slotted plate 470A. Each of the first and second slotted plates 470A,470B are respectively configured with receiving slots 472A,472B that are configured to receive at least a portion of the shifter base 360. The width of the receiving slots 472A,472B are configured to receive a portion of the shifter base 360 in substantially a close slip fit, or a friction fit in some example embodiments, so as to reduce any "play" between the shifter base 360 and edges of the slots 472A,472B. Generally, the width of the slots 472A,472B are substantially the same size as the distance between the forward and back surfaces of the shifter base 360, and just large enough so that the shifter base 360 can move freely in a lateral direction between the slots when the shifter assembly 312 is rotated from the normal automatic transmission mode into the manual shifting mode, and vice versa.

When the shifter assembly 312 is in the normal automatic mode, the shifter assembly 312 is substantially vertical and the shifter base 360 is received in the slot 472A of the first slotted plate 470A. The first slotted plate 470A is configured to rotate about the first pivot point 500 to interact with the automatic transmission linkage 480 to allow the operator to move the vehicle between park, neutral, drive, etc. As previously noted, when the shifter base 360 is received in the slot 472A, the first electronic shifter module 430A senses the normal automatic mode because the button switch 432 is in the open position by not contacting the manual mode activation member 434. When the operator selects the manual shifting mode by moving the shifter assembly 312 laterally, the shifter base 360 moves out of the slot 472A and into the slot 472B of the second slotted plate 470B. This rotation from normal mode into manual mode is only possible from one position within the normal automatic transmission mode, that is, when the front and back edges of the shifter base 360 are lined up directly within the slot 472B in the second slotted plate 470B. In an example embodiment of the present general inventive concept, that position within the normal automatic transmission mode would be overdrive. In any other position, the shifter base 360 would not be lined up directly within the slot 472B of the second slotted plate 470B, and the second slotted plate 470B would prohibit the shifter base 360 from moving into the slot 472B corresponding to the manual shifting mode.

Figure 11:
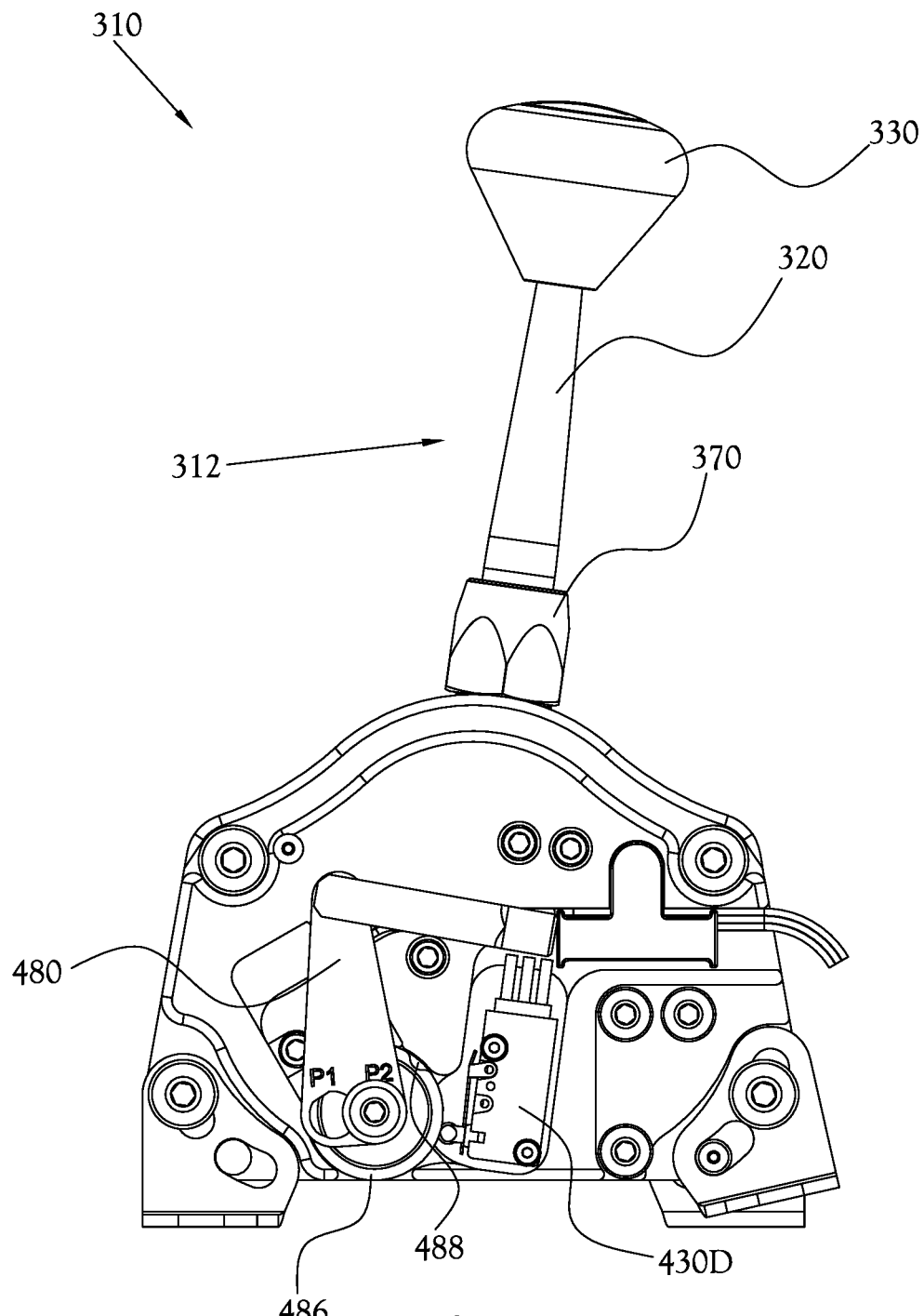
FIG. 11 illustrates a side view of the automatic transmission shifter mechanism of FIG. 6.

FIG. 11 illustrates a side view of the automatic transmission shifter mechanism of FIG. 6, showing the automatic transmission linkage 480 attached through one of the side casings 462. As illustrated in FIG. 11, in this example embodiment the automatic transmission linkage 480 is configured so as to be selectively fixed through two different proximal openings (P1,P2). It is understood that the side plates 160 of FIGS. 1-5, or other such support structures, may be utilized in lieu of the side casings 462 without departing from the scope of the present general inventive concept. In this example embodiment, the automatic transmission linkage 480 is connected by way of a series of gears to the first slotted plate 470A. The first slotted plate 470A has a gear extension 482 that extends toward, and interacts with a spur gear 484 arranged on the inner plate 460 of the side casing 462 housing the first electronic shifter module 130A. The spur gear 484 is arranged to be proximate the lower block 400 of the shifter assembly 312, and is coupled to the automatic transmission linkage 480 by a connecting member (not shown) extending through the side casing 462 located between the spur gear 484 and the automatic transmission linkage. Thus, when the shifter assembly 312 is moved back and forth in the normal automatic transmission mode, the movement of the first slotted plate 470A causes the gear extension 482 of the first slotted plate 470A to rotate the spur gear 484 accordingly, which causes the corresponding movement of the automatic transmission linkage 480 coupled to the spur gear 484. In this example embodiment, a detent collar 486, which also acts as a spacer, is arranged between the automatic transmission linkage 480 and the side casing 462 adjacent the spur gear 484. A fourth electronic shifter module 430D is arranged on the outer surface of the side casing 462 adjacent the detent collar 486, and is configured such that contact from the detent collar 486 closes a switch indicating that the transmission is not in reverse. The fourth electronic shifter module 430D has a biased member that is biased in the direction of the detent collar 486, and which is pressed by the detent collar 486 toward the fourth electronic shifter module 430D to close the switch in all of the positions of the automatic transmission linkage 480 except reverse. The detent collar 486 has a detent 488 formed on the detent collar 486 such that, when the automatic transmission linkage 480 is moved to the reverse position by the shifter assembly 312, the detent 488 of the detent collar 486 allows the biased member of the fourth electronic shifter module 430D to move in the direction away from the fourth electronic shifter module 430D, opening the switch and indicating reverse operation of the transmission. The fourth electronic shifter module 430D may then be used to operate a reverse light or other such indication or function of the transmission being in reverse. In various example embodiments the opening and closing functions of the switch of the fourth electronic shifter module 430D could be reversed, with an open switch indicating the transmission is not in reverse, and an protrusion formed on a spacer collar closing the switch and indicating a reverse operation.

As previously described, when the shifter assembly 312 is in the normal automatic transmission mode and the shifter base 360 is in the slot 472A of the first slotted plate 470A, movement of the shifter assembly 312 in the fore/aft position drives the automatic transmission linkage 480. When the shifter assembly 312 is in the manual shifting mode and the shifter base 360 is in the slot 472B of the second slotted plate 470B, the second slotted plate 470B is configured to act as a rocker plate to control the movement of the shifter assembly 312. The second slotted plate 470B is also configured to rotate about the first pivot point 500, like the first slotted plate 470A. However, the first and second slotted plates 470A,470B are configured to rotate independently of one another. In the manual shifting mode, the shifter assembly 312 can be pushed forward to move up a gear, and can be pulled back to move down a gear. The forward and backward movement of the second slotted plate 470B, which moves in register with the shifter assembly 312 in the manual shifting mode, is limited by stopping members provided at an inner surface 460 of the side casing 462 adjacent the second slotted plate 470B. In this example embodiment, the second slotted plate 470B is biased in both the forward and back directions to maintain a centered position which will receive the shifter base 360 in the slot 472B, and which will allow the shifter assembly 312 to be moved such that the shifter base 360 moves immediately into the slot 472A of the first slotted plate 470A. In this example embodiment, the second slotted plate 470B is biased by a pair of compression springs 530 arranged in the side casing 462 adjacent the detent plate 420. The side casing 462 adjacent the detent plate 420 has been made transparent in FIG. 10 to show an example embodiment of an arrangement of the compression springs 530. As illustrated in FIG. 10, the compression springs interact with respective protrusions 532 provided on a side of the second slotted plate 470B and arranged to protrude through slots in an inner plate 460 of the side casing 462 to compress the respective compression springs 530 when the shifter assembly 312 is moved forward and back to shift gears in the manual shifting mode. The compression springs 530 bias the shifter assembly 312 to the position in between up and down shifts in the manual mode, the centered position which receives the shifter base 360 in the slot 472B, and which will allow the shifter assembly 312 to be moved such that the shifter base 360 moves immediately into the slot 472A of the first slotted plate 470A. The slots in the side plate 460 of the side casing 462 through which the protrusions 532 extend may be elongated and curved to allow the bias to be overcome by the operator's movement of the shifter assembly 312 in the forward and back directions, but to stop movement at a predetermined terminal position in each direction. Thus, for example, moving the shifter assembly 312 forward to move up one gear pushes against an end of the compression spring 530 that is biasing the shifter assembly 312 in the backward direction, and the forward movement will be stopped when the protrusion 532 contacts the end of the slot through which the protrusion 532 extends. Similarly, when the pressed compression spring 530 moves the shifter assembly 312 back to the centered position, the movement will be stopped at the substantially equilibrium point between the two compression springs 530 acting on the protrusions 532 of the second slotted plate 470B.

In the example embodiments illustrated in these drawings, second and third electronic shifter modules 430B,430C are provided adjacent the inner surface 460 of the side casing 462 that is adjacent the second slotted plate 470B to sense up and down shifting in the manual shifting mode. As illustrated in FIG. 7, the second electronic shifter module 430B is provided proximate a forward inner surface 460 of the side casing 462 adjacent to second slotted plate 470B, and is configured to sense the forward movement of the shifter assembly 312 in the manual shifting mode. In this example embodiment, the second electronic shifter module 430B is configured such that contact from the second slotted plate 470B when rotated forward closes a switch indicating the forward position of the shifter assembly 312. Similar to the configuration of the first electronic shifter module 430A, the second electronic shifter module 430B may include a button switch that contacts a forward outer edge of the second slotted plate 470B when the shifter assembly 312 is moved forward, but is not in contact with the second slotted plate 470B when the shifter assembly 312 is not actively pushed forward. Thus, only the forward rotation of the second slotted plate 470B to the terminal point causes the contact which actuates the switch. In such a configuration, the forward outer edge of the second slotted plate 170B may be formed so as to only contact the button switch of the second electronic shifter module 430B when the "rocker plate" has been rotated forward to the terminal point to indicate a gear change. Similarly, the third electronic shifter module 430C, which is provided proximate a back inner surface 460 of the side casing 462 adjacent to the second slotted plate 470B, may include a button switch arranged to contact a back outer edge of the second slotted plate 470B when there is backward rotation of the second slotted plate 470B to the terminal point. In such a configuration, the back outer edge of the second slotted plate may be formed to only contact the button switch of the third electronic shifter module 430C when the "rocker plate" has been rotated backward to the terminal point. Release of the shifter assembly 312 back into the central position releases pressure on the corresponding buttons or other such contact sensors. Thus, electronic sensing of the operator's shifting of the shifter assembly 312 forward and backward in the manual shifting mode causes electronic control of the corresponding gear changes. In this example embodiment, each of the electronic shifter modules 430A,430B,430C,430D contains a button (not shown) which, when depressed, communicates with an electronic controller to affect the gear and/or mode changes. Additionally, when the shifter assembly 312 is in the manual shifting mode, and the shifter base is in the slot 472B of the second slotted plate 470B, the manual mode activation member 434 maintains contact with the button switch 432 of the first electronic shifter module 430A, causing the first electronic shifter module 430A to sense and indicate the manual shifting mode to the electronic controller.

When the shifter assembly 312 is in normal automatic transmission mode, the shifter base 360 is not in the slot 472B of the second slotted plate 470B, and movement of the shifter assembly 312 does not engage the second and third electronic modules 430B,430C, which are fore and aft of the second slotted plate 470B, and the buttons on the two electronic modules 430B,430C remained in their neutral, non-depressed state.

Various example embodiments of the present general inventive concept may provide an automatic transmission shifter mechanism that is selectable between an automatic transmission mode and a manual shifting mode, including a shifter assembly configured to move in a first range of movement to be positioned in the automatic transmission mode, and to move in a second range of movement to selectively shift gears up and down in the manual shifting mode, a first sensor configured to sense that the shifter assembly is in the automatic transmission mode in response to the shifter assembly being in the first range of movement, and at least a second sensor configured to sense gear changes in the manual shifting mode, wherein the shifter assembly is configured to be selectively moved laterally from the first range of movement to the second range of movement when in a drive mode in the first range of movement. The first range of movement may be substantially parallel to the second range of movement, the lateral movement may be substantially perpendicular to the first and second range of movement, and reversing the lateral movement of the shifter assembly may move from the second range of movement to the first range of movement. A base member of the shifter assembly may be configured to be in physical communication with the first sensor when the shifter assembly is in the first range of movement. The automatic transmission shifter mechanism may further include a pivoting portion that is coupled to the base member of the shifter assembly when the shifter assembly is in the second range of movement, wherein the pivoting portion contacts the at least a second sensor to actuate sensing of the gear changes in the manual shifting mode. The at least a second sensor may include the second sensor and a third sensor, the second sensor being configured to be contacted by the pivoting portion when the shifter assembly is pushed forward, and the third sensor being configured to be contacted by the pivoting portion when the shifter assembly is pushed backward. The pivoting portion may be configured as a cam that maintains physical communication with both the second and the third sensor throughout the second range of movement, and which causes sufficient pressure to actuate the second and the third sensors when the shift assembly is at terminal points of the second range of movement. The automatic transmission shifter mechanism may further include at least one biasing member configured such that the pivoting portion is biased in forward and backward directions in the second range of movement such that a central position is maintained without user interaction. The pivoting portion may be configured with a receiving portion that substantially conforms to a portion of the base member received therein to couple the pivoting portion to the base member.

Various example embodiments of the present general inventive concept may provide an automatic transmission shifter mechanism that is selectable between an automatic transmission mode and a manual shifting mode, including a shifter assembly, a block attached to the shifter assembly, a pin attached to the block, at least one slotted plate which interacts with the shifter assembly, and a detent plate proximate to the block, wherein selected shifter assembly positions in the automatic transmission mode are maintained by the pin being located within a corresponding detent of the detent plate, and wherein a predetermined movement of the shifter assembly causes the pin to move out of range of detents in the detent plate such that an operator can shift freely between drive gears in the manual shifting mode. The automatic transmission shifter mechanism may further include a lockout button attached to a knob on the shifter assembly, wherein depression of the lockout button causes the pin to move away from the detent plate and allows the operator to shift from park into reverse and drive gears while in the automatic transmission mode. The shifter assembly may be configured to be moved in a forward or rearward direction to shift between drive gears in the manual shifting mode. The automatic transmission shifter mechanism may further include a shifter base integral with the shifter assembly, and a lower shaft projection at the lower end of the shifter base. The manual shifting mode may be activated by an operator moving a portion of the shifter base into a receiving portion of the slotted plate. Movement of the portion of the shifter base into the receiving portion of the slotted plate may move the block in a downward direction and simultaneously moves the pin out of range of detents in the detent plate. An upper surface of the block may include first and second detents, the second detent formed at a higher position than the first detent, and wherein movement of the portion of the shifter base into the receiving portion of the slotted plate causes the lower shaft projection to register with the second detent, which moves the block in a downward direction and simultaneously moves the pin out of range of detents in the detent plate. The automatic transmission shifter mechanism may further include an electronic controller, at least one electronic module in direct or indirect contact with the shifter assembly, a button on the at least one electronic module, wherein a movement of the shifter assembly may cause the button on the at least one electronic module to be engaged. Engagement of the button on the at least one electronic module may cause the at least one electronic module to communicate with the controller. The at least one electronic module attached to the shifter assembly may include first and second electronic modules, movement of the shifter assembly in one direction in the manual shifting mode may cause engagement with the button on the first electronic module and movement of the shifter assembly in the opposite direction causes engagement with the button on the second electronic module, the button on the first electronic module and the button on the second electronic module may be configured to not be engaged simultaneously and engagement of either the button on the first electronic module or the button on the second electronic module may cause the respective first or second electronic module to communicate with the controller. The at least one electronic module attached to the shifter assembly may include a third electronic module, and when the automatic transmission shifter mechanism is in the automatic transmission mode, the button on the third electronic module may be engaged and may cause the third electronic module to communicate with the controller. When the automatic transmission shifter mechanism is in the manual shifting mode, the button on the third electronic module may not be engaged, and when the automatic transmission shifter mechanism is in the automatic shifting mode, the buttons on the first and second electronic modules may not be engaged.

Various example embodiments of the present general inventive concept may provide an automatic transmission shifter mechanism that is selectable between an automatic transmission mode and a manual shifting mode, including a shifter assembly, a pin attached to the shifter assembly, a first slotted plate to selectively receive a first portion of the shifter assembly, and a detent plate configured to receive the pin at different gear positions, wherein selected shifter assembly positions in the automatic transmission mode are maintained by the pin being located within a corresponding detent of the detent plate, and wherein movement of the first portion of the shifter assembly into the first slotted plate causes the pin to move out of range of detents in the detent plate such that an operator can shift between drive gears in the manual shifting mode. The automatic transmission shifter mechanism may further include a lockout button attached to a knob on the shifter assembly, wherein depression of the lockout button causes the pin to move away from the detent plate and allows the operator to shift from park into reverse and drive gears while in the automatic transmission mode. The shifter assembly may be configured to be moved in a forward or rearward direction to shift between drive gears in the manual shifting mode. The automatic transmission shifter mechanism may further include a block at a distal end of the shifter assembly, and a lower shaft projection at the lower end of the shifter base, wherein the pin is attached to the block, wherein the block is moved up and down according to movement of a lockout button on the shifter assembly, and wherein the block has a contoured upper surface configured to selectively receive the lower shaft projection in a first position which the pin interacts with the detent plate, and in a second position which maintains the block in a lower position in which the pin does not interact with the detent plate. The first slotted plate may be configured as a rocker plate. The automatic transmission shifter mechanism may further include a pair of compression springs configured to bias the rocker plate proximate opposing ends of the rocker plate. The automatic transmission shifter mechanism may further include a manual mode sensor switch configured to be contacted by a lower portion of the shifter assembly when the shifter assembly is in the manual shifting mode, and to indicate to an electronic controller that the shifter assembly is in the manual shifting mode. A button of the manual mode sensor may be contacted by a projection extending from the shifter assembly when the shifter assembly is in the manual shifting mode, and the projection may move away from the button of the manual mode sensor when the shifter assembly is in the automatic transmission mode. The automatic transmission shifter mechanism may further include an upshift sensor switch configured to be actuated by a first portion of the first slotted plate when the shifter assembly is moved to upshift in the manual shifting mode, and a downshift sensor switch configured to be actuated by a second portion of the first slotted plate when the shifter assembly is moved to downshift in the manual shifting mode, wherein the upshift and downshift sensor switches may communicate gear shifting signals to an electronic controller. The upshift and downshift sensor switches may be configured to not be engaged simultaneously. The automatic transmission shifter mechanism may further include a reverse sensor switch that is configured to be actuated when the shifter assembly is shifted into reverse, and to communicate the reverse position to an electronic controller. The reverse sensor may be actuated by a detent formed in a detent collar that moves with the automatic transmission linkage. The automatic transmission shifter mechanism may further include a second slotted plate to selectively receive a second portion of the shifter assembly opposite the first portion of the shifter assembly selectively received by the first slotted plate, wherein the second portion of the shifter assembly may be received in the second slotted plate when the shifter assembly is in the automatic transmission mode. The second slotted plate may include a gear member that interacts with at least one more gear member coupled to the automatic transmission linkage. The second slotted plate may be configured to only move when the second portion of the shifter assembly is received in the second slotted plate for the automatic transmission mode. The second portion of the shifter assembly may be configured to only move out of the second slotted plate, moving the first portion of the shifter assembly into the first slotted plate, when the shifter assembly is in the drive position.

Numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. An automatic transmission shifter mechanism that is selectable between an automatic transmission mode and a manual shifting mode, comprising:
    a shifter assembly;
    a pin attached to the shifter assembly;
    a first slotted plate to selectively receive a first portion of the shifter assembly;
    a detent plate configured to receive the pin at different gear positions;
    a block at a distal end of the shifter assembly; and
    a lower shaft projection at the lower end of the shifter base;
    wherein selected shifter assembly positions in the automatic transmission mode are maintained by the pin being located within a corresponding detent of the detent plate;
    wherein movement of the first portion of the shifter assembly into the first slotted plate causes the pin to move out of range of detents in the detent plate such that an operator can shift between drive gears in the manual shifting mode;
    wherein the pin is attached to the block;
    wherein the block is moved up and down according to movement of a lockout button on the shifter assembly; and
    wherein the block has a contoured upper surface configured to selectively receive the lower shaft projection in a first position which the pin interacts with the detent plate, and in a second position which maintains the block in a lower position in which the pin does not interact with the detent plate.

2. The automatic transmission shifter mechanism according to claim 1, further comprising a lockout button attached to a knob on the shifter assembly, wherein depression of the lockout button causes the pin to move away from the detent plate and allows the operator to shift from park into reverse and drive gears while in the automatic transmission mode.

3. The automatic transmission shifter mechanism according to claim 1, wherein the shifter assembly is configured to be moved in a forward or rearward direction to shift between drive gears in the manual shifting mode.

4. The automatic transmission shifter mechanism according to claim 1, wherein the first slotted plate is configured as a rocker plate.

5. The automatic transmission shifter mechanism according to claim 4, further comprising a pair of compression springs configured to bias the rocker plate proximate opposing ends of the rocker plate.

6. The automatic transmission shifter mechanism according to claim 1, further comprising:
    a manual mode sensor switch configured to be contacted by a lower portion of the shifter assembly when the shifter assembly is in the manual shifting mode, and to indicate to an electronic controller that the shifter assembly is in the manual shifting mode.

7. The automatic transmission shifter mechanism according to claim 6, wherein a button of the manual mode sensor is contacted by a projection extending from the shifter assembly when the shifter assembly is in the manual shifting mode, and wherein the projection moves away from the button of the manual mode sensor when the shifter assembly is in the automatic transmission mode.

8. The automatic transmission shifter mechanism according to claim 1, further comprising:
    an upshift sensor switch configured to be actuated by a first portion of the first slotted plate when the shifter assembly is moved to upshift in the manual shifting mode; and
    a downshift sensor switch configured to be actuated by a second portion of the first slotted plate when the shifter assembly is moved to downshift in the manual shifting mode;
    wherein the upshift and downshift sensor switches communicate gear shifting signals to an electronic controller.

9. The automatic transmission shifter mechanism according to claim 8, wherein the upshift and downshift sensor switches are configured to not be engaged simultaneously.

10. The automatic transmission shifter mechanism according to claim 1, further comprising a reverse sensor switch that is configured to be actuated when the shifter assembly is shifted into reverse, and to communicate the reverse position to an electronic controller.

11. The automatic transmission shifter mechanism according to claim 10, wherein the reverse sensor is actuated by a detent formed in a detent collar that moves with the automatic transmission linkage.

12. The automatic transmission shifter mechanism according to claim 1, further comprising a second slotted plate to selectively receive a second portion of the shifter assembly opposite the first portion of the shifter assembly selectively received by the first slotted plate, wherein the second portion of the shifter assembly is received in the second slotted plate when the shifter assembly is in the automatic transmission mode.

13. The automatic transmission shifter mechanism according to claim 12, wherein the second slotted plate includes a gear member that interacts with at least one more gear member coupled to the automatic transmission linkage.

14. The automatic transmission shifter mechanism according to claim 13, wherein the second slotted plate is configured to only move when the second portion of the shifter assembly is received in the second slotted plate for the automatic transmission mode.

15. The automatic transmission shifter mechanism according to claim 12, wherein the second portion of the shifter assembly can only move out of the second slotted plate, moving the first portion of the shifter assembly into the first slotted plate, when the shifter assembly is in the drive position.

* * * * *